United States Patent [19]
Inagaki et al.

[11] 3,740,628
[45] June 19, 1973

[54] LINEAR ELECTRIC MOTOR

[75] Inventors: Junpei Inagaki; Susumu Tadakuma, both of Yokohama, Japan

[73] Assignee: Tokyo Shibaura Electric Company, Ltd., Kawasaki-shi, Kanagawa-ken, Japan

[22] Filed: June 8, 1971

[21] Appl. No.: 151,114

[30] Foreign Application Priority Data
June 11, 1970   Japan.................. 45/49985

[52] U.S. Cl.............. 318/135, 104/148 LM, 310/12
[51] Int. Cl. ........................................... H02k 41/02
[58] Field of Search.............................310/12–19; 318/121, 135, 683; 104/148 LM

[56] References Cited
UNITED STATES PATENTS

| | | | |
|---|---|---|---|
| 3,594,622 | 7/1971 | Inagaki .............................. | 318/135 |
| 3,225,228 | 12/1965 | Roshala .............................. | 310/12 |
| 3,577,929 | 5/1971 | Onoda et al. ................. | 104/148 LM |
| 3,575,650 | 4/1971 | Fengler.............................. | 318/135 |
| 3,407,749 | 10/1968 | Frig................................... | 318/135 X |
| 3,435,312 | 3/1969 | DeCoster........................ | 318/135 X |

*Primary Examiner*—D. F. Duggan
*Attorney*—Norman F. Oblon, Stanley P. Fisher and Marvin J. Spivak

[57]   ABSTRACT

A linear electric motor, which includes an elongated reaction rail having north and south magnetic poles alternately disposed therealong and an armature having polyphase windings which is moved along the reaction rail, is provided with a position detector for detecting the relative position between the magnetic poles of the reaction rail and the armature. The armature windings are energized from an electric power supply through a static commutator formed of semiconductor elements. The position detector responds to the speed electromotive force induced in the armature windings and causes the semiconductor elements in the static commutator to turn on and off in a perdetermined sequence.

6 Claims, 7 Drawing Figures

Patented June 19, 1973
3,740,628
3 Sheets-Sheet 1
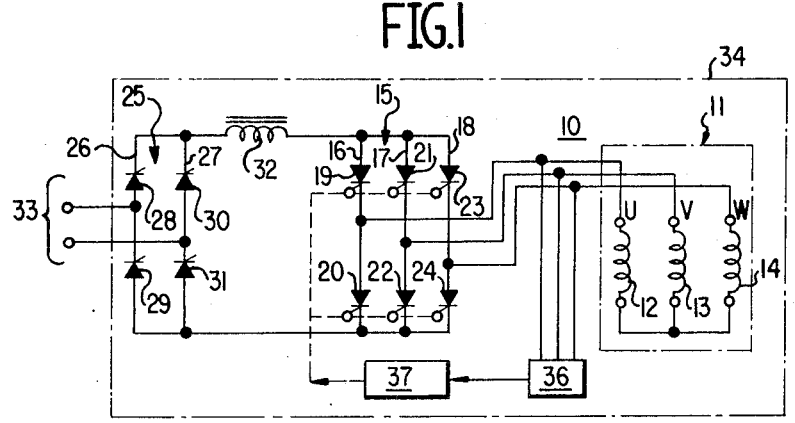
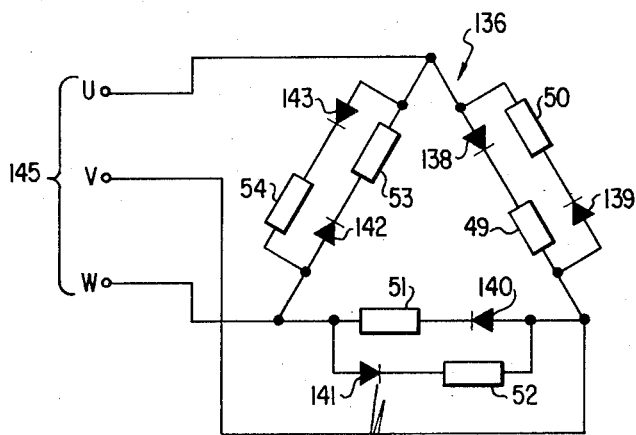
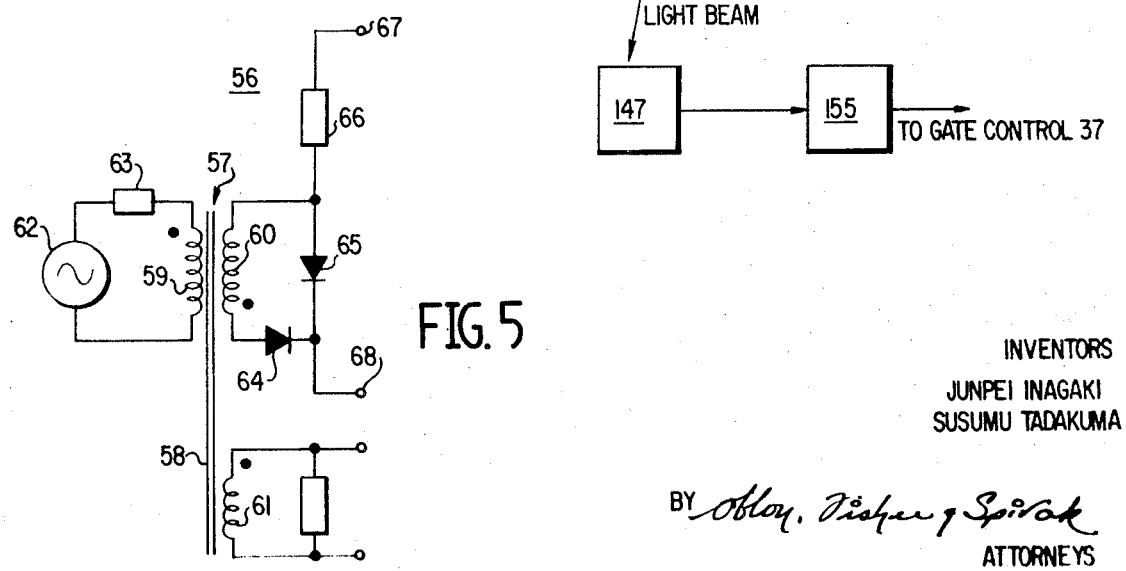
INVENTORS
JUNPEI INAGAKI
SUSUMU TADAKUMA
BY *Oblon, Fisher & Spivak*
ATTORNEYS Patented June 19, 1973  3,740,628
3 Sheets-Sheet 2
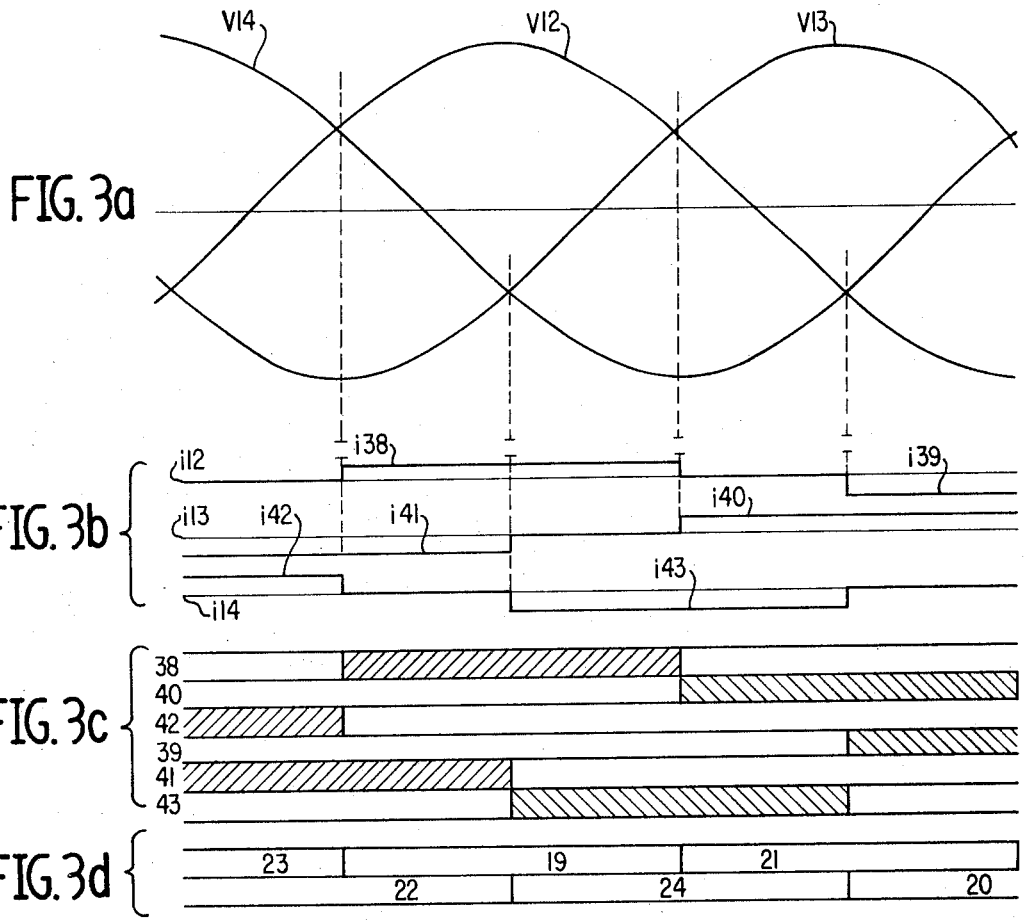
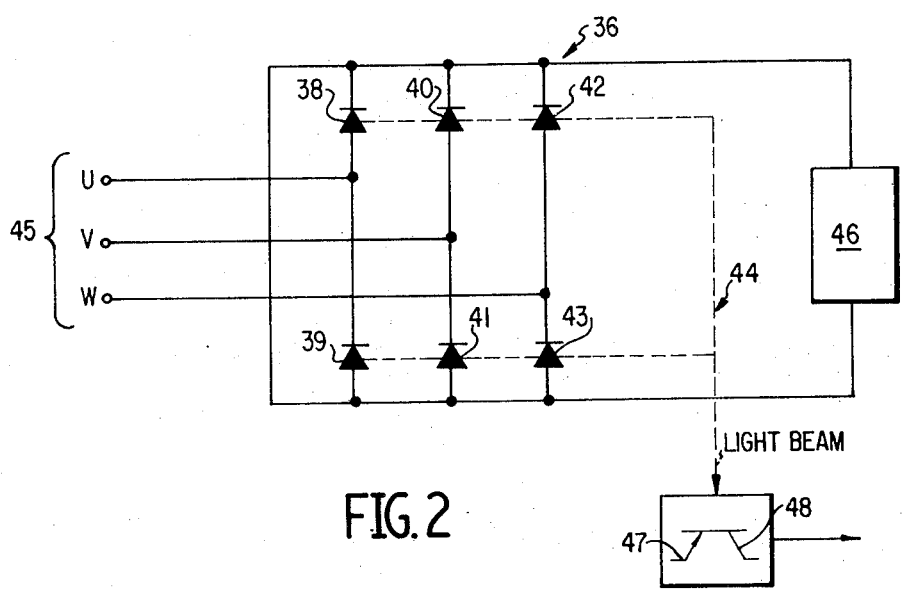
FIG. 2

Patented June 19, 1973  3,740,628

LINEAR ELECTRIC MOTOR

BACKGROUND OF THE INVENTION

1. Field of the Invention

The present invention generally relates to a linear electric motor, and more particularly to a linear electric motor in which the relative position between the north and south magnetic poles alternately disposed along an elongated reaction rail and an armature capable of movement along the rail is detected by detecting the speed electromotive force induced in the armature windings of the armature by the magnetomotive force generated from the reaction rail.

2. Description of the Prior Art

Recently, the use of linear electric motors has been realized for the purpose of high speed transportation. As is well known, the linear electric motor generally has an armature having polyphase windings wound thereon and the same moves along an elongated reaction rail. The reaction rail is provided with magnetic poles or north and south polarities and are alternately disposed along the longitudinal direction thereof. To energize the armature windings by an A.C. voltage without using brushes, the linear electric motor is provided with a static commutator, such as a thyristor bridge or a cycloconverter formed of either thyristors or transistors.

In the linear electric motor, it is necessary to use a suitable angular position detector for selectively energizing each phase winding of the armature in a predetermined sequence and for detecting the relative angular position between the magnetic poles and each phase winding of the armature at a predetermined time. In the past, the angular position detector has been formed of an approach type switching device having inductive elements mounted on the armature so as to be magnetically and successively coupled with the magnetic poles of the reaction rail through an air gap.

It can be generally seen that such a linear motor is effectively adapted to be used as a drive for a high speed electric train. However, in operation, some irregular motions, such as rolling, pitching, lateral movement or a combination thereof will often occur as the train runs. During such irregular motions, variations in the distance between the magnetic poles of the rail and the approach switching device will occur during the running of the train. This in turn would cause fine and rough magnetic coupling between the reaction rail and the approach switching device. When the rough magnetic coupling between the rail and the approach switching device would occur, the output from the approach switching device would be of a level insufficient to energize a gate control for the static converter. Such unfavorable phenomena would also often occur due to the inclination of the train when the same would run along a curved rail. During such time, the thyristors or the transistors would fail to turn on and off periodically, and thereby not only would a failure of communication in the coverter formed of thyristors often occur, but also an insufficient pull for the train would often occur.

SUMMARY OF THE INVENTION

Accordingly, it is an object of the present invention to provide a new and improved unique linear electric motor which is capable of accurate operation in the presence of irregular motions.

Another object of the present invention is to provide a new and improved linear electric motor in which speed electromotive forces, which are induced in each phase winding of an armature by a magnetomotive force generated from a reaction rail, are detected for supplying gating signals to the gate control of a static converter for energization of the armature.

Still another object of the present invention is to provide a new and improved linear motor in which a position detector has a photoelectric device which includes photodiodes connected to the armature windings so as to be energized therefrom and to emit light beams respectively to illuminate corresponding photoelectric transducers which in turn control a static converter.

Yet one other object of the present invention is to provide a new and improved unique linear electric motor in which the position detector thereof includes three transformers each having primary, secondary and tertiary windings wound on a core thereof, each of the primary windings being connected to a high frequency oscillator for energization thereof, each of the secondary windings being connected to a corresponding phase winding of the armature to be controlled by a speed electromotive force induced therein and having a predetermined polarity, and wherein a high frequency output is taken from the tertiary winding when the secondary winding is opened under the control of the speed electromotive force.

Briefly, in accordance with the present invention, these and other objects are in one aspect attained by the provision of a linear electric motor having an elongated reaction rail including north and south poles alternately disposed therealong. An elongated armature having polyphase windings is provided and the same is magnetically coupled to the reaction rail in such a fashion as to allow rectilinear movement therebetween. A static commutator is connected to the armature windings and enables an excitation current to be periodically and selectively applied to the respective phase windings of the armature. A position detector is provided for electrically detecting the relative position between the armatur windings and the magnetic poles of the reaction rail and to generate control signals for the static commutator. The position detector is directly connected to the input terminals of the armature windings so as to respond to speed electromotive forces induced in the armature windings by a magnetomotive force of the rail.

BRIEF DESCRIPTION OF THE DRAWINGS

A more complete appreciation of this invention will be readily obtained as the same becomes better understood by reference to the following detailed description when considered in connection with the accompanying drawings, wherein:

FIG. 1 is a schematic diagram of a linear electric motor in accordance with one embodiment of the present invention;

FIG. 2 is a circuit diagram of a position detector which is employed in the linear motor shown in FIG. 1;

FIGS. 3a, 3b, 3c and 3d show waveforms for illustration of operation of the position detector of FIG. 2;

FIG. 4 is a schematic circuit diagram of another and alternative type of position detector which is employed in the linear motor of FIG. 1; and, FIGS. 5, 6 and 7 respectively show still other alternative types of position detectors capable of use with the linear motor of FIG. 1.

DETAILED DESCRIPTION OF THE PREFERRED EMBODIMENTS

Figure 6:
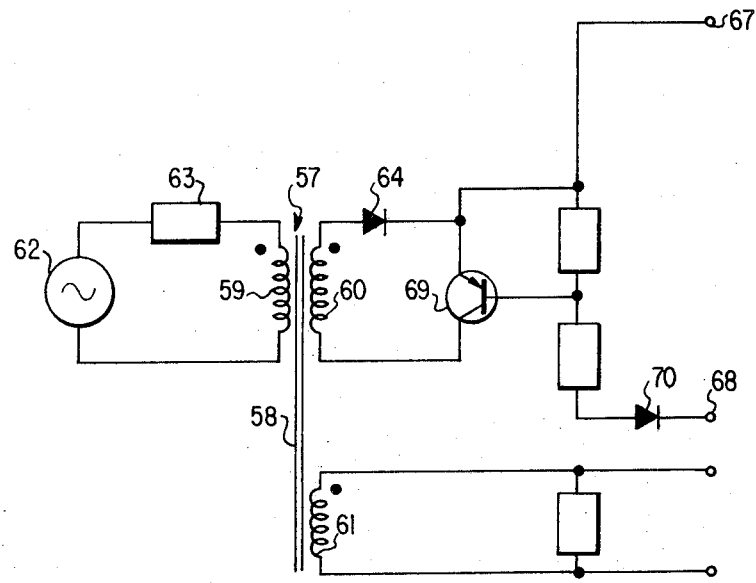

Referring now to the drawings, wherein like reference numerals designate identical or corresponding parts throughout the several views, and more particularly to FIG. 1 thereof, wherein one preferred embodiment of a linear electric motor 10 in accordance with the present invention is shown as including an armature 11 having three armature windings 12, 13 and 14 which are connected in a three-phase star arrangement. Each of the three-phase windings 12, 13 and 14 are wound on a stator core (not shown).

In order to energize the armature windings, a static converter or commutator 15 having three arms 16, 17 and 18 is provided. The three arms are connected in parallel and each of the arms includes a pair of respective serially connected thyristors 19, 20, 21, 22, 23 and 24. An intermediate connecting point between each of the serially connected thyristors is connected so the corresponding input of the respective windings 12, 13 and 14.

A variable D.C. voltage supply 25 is provided and includes a pair of arms 26 and 27 each having a pair of serially connected thyristors 28, 29, 30 and 31. The variable D.C. voltage supply 25 supplies variable D.C. voltages to the input terminals of the static commutator 15 through a smoothing reactor 32. An intermediate connecting point between the serially connected thyristors 28, 29, 30 and 31 is connected to an A.C. voltage source 33.

It should be understood that all of the aforesaid parts may by way of example be mounted on the body of a train as generally shown with a reference numeral 34.

A reaction rail 35 is provided and includes north and south poles N and S alternately disposed along the lengthwise direction of the rail. In order to simplify the illustration, it should be understood that the D.C. excitation device for the rail 35 is not shown. The rail may be of the salient pole type and in such case a conductor for supplying D.C. excitation is wound around the magnetic poles in a reverse direction so as to alternately make N and S poles. It should be apparent that the invention is not so limited and that the rail 35 may also be of the comb-shaped pole type. In this case, the rail may be made of an elongated iron web. The web is machined to form comb-shaped pole members at the opposite side edges of the rail. The web is then rounded or folded in the widthwise direction thereof so as to provide either a circular cross section or a rectangular cross section, and the comb-shaped poles are engaged with each other so as to leave a small air gap therebetween. A conductor for supplying D.C. excitation is then extended through the hollow comb-shaped pole type rail. It is thus understood that when a D.C. current flows through the conductor the comb-shaped magnetic poles will alternately make N and S poles.

The reaction rail 35 may be positioned along a conventional railway or railroad (not shown). In one case, the body of the train 34 is provided with flanged wheels and will roll on the railroad. In another case, the reaction rail 35 itself may be employed as the railway or railroad. In still another case, the reaction rail 35 is located above the earth's surface, and serves as a saddle for mounting the body 34 movably thereon.

As is well known in the art, either trolley wires or third rails (not shown) may be provided along the reaction rail 35 for supplying an A.C. voltage to the terminals 33 of the D.C. variable voltage supply 25. However, if an A.C. voltage supply, such as a diesel-electric generator, is mounted on the body of the train, then the trolley wires or the third rails can be eliminated.

It should be further understood that the armature 11 has a linearly elongated form and a flat surface which is positioned to face the magnetic pole surfaces of the reaction rail 33. The armature windings 12, 13 and 14 are located in the three-phase belt of the armatures functional surface.

In order to obtain proper gating signals for turning on in a predetermined sequence the thyristors 19 through 24 of the static commutator 15, an angular position detector 36 which is capable of electrical operation is provided. The position detector 36 is connected to the input terminals of the armature windings to be energized by speed electromotive forces induced therein, and the output of the same is connected to a conventional gate control 37 which generates signals for controlling the thyristors 19 through 24.

One type of a suitable position detector 36 is shown in FIG. 2 and includes six photodiodes 38 through 43 connected in a three-phase full wave bridge rectifier 44. The inputs 45 of the rectifier bridges are respectively connected to the inputs of the armature windings 12, 13 and 14 of FIG. 1, and the outputs of the same are connected to an impedance or resistance element 46 which acts to restrict the amplitude of the rectified current.

As is well known, the photodiodes or photoluminescence-diodes 38 through 43 emit light beams therefrom when an electric current respectively passes therethrough. The light beams emitted from the photodiodes 38 through 43 are directed to a photoelectric transducer 47 which includes a corresponding number of photoelectric transducing elements, such for example as phototransistors 48. The output signals from the phototransistors 48 are suitably combined with each other and then are added to the gate control 37 of FIG. 1.

FIG. 3a shows waveforms V12, V13 and V14 which correspond to the speed electromotive forces induced in the respective armature windings 13, 13 and 14 of the armature 11. FIG. 3b shows waveforms i12, i13 and i14 which correspond to the electric currents respectively flowing through the diodes 38 through 43 in response to the speed electromotive forces V12, V13 and V14. The currents flowing through the respective diodes 38 through 43 are designated by the numerals i38 through i43. FIG. 3c shows the conduction periods of the respective diodes 38 through 43 with oblique lines, and FIG. 3d shows the turn-on periods for the respective thyristors 19 through 24 as the same in turn become conductive under the control of the gate control 37.

In operation, when it is intended to start the linear motor 10, an abrupt excitation will be applied to the reaction rail 35 to generate induced voltages in the armature windings 12, 13 and 14. The position detector 36 in response thereto will generate output signals therefrom. The signals from the detector 36 are then suitably combined with each other in the conventional gate control 37 to thereby cause the thyristors 19 through 24 to turn on in accordance with a predetermined sequence. The train 34 can thus be started in a desired direction.

It should be understood that in order to start the train 34, an additional electric motor (not shown) may be employed to provide an additional starting torque only during the starting period of the train.

It can be seen that if the thyristors 19 through 24 in the static commutator 15 are turned on in a predetermined sequence defined by the output signals supplied from the position detector 36 and the gate control 37 that the desired running of the train 34 will continue.

If it is desired to vary the train speed, this can be easily accomplished by varying the output voltage level of the D.C. voltage supply 25 in accordance with the phase control of the gate signals for the thyristors 28 through 31.

It can also be readily understood that a regenerative or suppressing brake can be easily accomplished by changing the mode of operation of the static commutator 15 from an inverter mode to a rectification mode, and by changing the mode of operation of the D.C. voltage supply 25 from a rectification mode to an inverter mode.

With this embodiment, it can be easily understood that the relative position between the armature windings and the magnetic poles of the reaction rail can be readily and precisely detected every time in accordance with the speed electromotive forces induced in the armature windings 12, 13 and 14, even in the presence of irregular motion of the train, such for example as rolling, pitching, lateral oscillation and any combination thereof, during the running of the train. With such accurate detections, misoperation of the thyristors 19 through 24 in the static commuator, which may cause not only a failure of commutation of the static commutator, but also insufficient pull for the train, will not occur.

In addition to the above, since the angular position detector 36 of the present invention does not have any magnetic inductive elements therein, it is not necessary to consider the influence of an external magnetic field upon the angular position detector.

FIG. 4 shows another and alternative position detector 136 for use with the present invention and the same includes six photoluminescence-diodes 138 through 143 each having a respective resistance element 49 through 54 connected in series thereto. Three pairs of the circuits each having a serially connected photodiode and a resistance element are oppositely connected in parallel and then are connected in a delta arrangement as shown. Leads 145 from the apexes of the delta arrangement are then connected to the input terminals of the armature windings 12, 13 and 14 of FIG. 1.

The light beams emitted from the respective photodiodes 138 through 143 will illuminate a plurality of phototransistors located in a photoelectric transducer 147, and the output signals from the photoelectric transducer 147 are then conducted to a conventional logic circuit 55 for enabling the signals to be properly combined with each other. In this way, the logic circuit 55 will generate output signals therefrom for controlling the gate control 37 of FIG. 1.

Referring now to FIG. 5, there is shown a further alternative embodiment of a position detector 56 suitable for use with the present invention and the same includes a transformer 57 having a core 58, and primary, secondary and tertiary windings 59, 60 and 61 wound thereon. The primary winding 59 is normally energized from a high frequency oscillator 62 through a resistor 63. The secondary winding 60 has a diode 64 serially connected thereto with a polarity as shown, and a diode 65 having a polarity as shown is connected across the serially connected winding 60 and diode 64. The secondary winding 60 is then connected between different phase lines of the input terminals of the armature windings 12, 13 and 14 of FIG. 1 through a current limiting resistor 66 and terminals 67 and 68.

It can be seen that the secondary winding 60 is short circuited by the diode 65 during the half cycle of speed electromotive forces when the terminal 67 becomes positive and the terminal 68 becomes negative. Accordingly, during such half cycles the high frequency output signals will not appear on the tertiary winding 61. On the other hand, when the terminal 67 becomes negative and the terminal 68 becomes positive during the other half cycle, the short circuiting of the secondary winding 60 will not occur and thereby the high frequency output signals will be present on the tertiary winding 61. It should be understood that in operation, three or six of such circuits are provided and combined with the input terminals of the armature windings 12, 13 and 14 of FIG. 1, and the output signals emitted from each of the tertiary windings 61 are employed as the position detection signals for controlling the gate control 37 of FIG. 1.

With such a position detecting circuit, it can also be understood that the position detection can be satisfactorily performed, in a similar manner to those of FIGS. 2 and 4, without the need of using photoluminescence-diodes.

Referring now to FIG. 6, it is seen that the short circuit of FIG. 5 for shorting the secondary winding 60 can be provided by a transistor 69 which provides a short during the half cycle of the speed electromotive force when the terminal 67 becomes positive and the terminal 68 becomes negative, and a diode 70 having a polarity as shown and which is connected in series between the terminals 67 and 68 and serves to hold the off-state condition of the transistor 69 during the other half cycle of the speed electromotive force.

Figure 7:
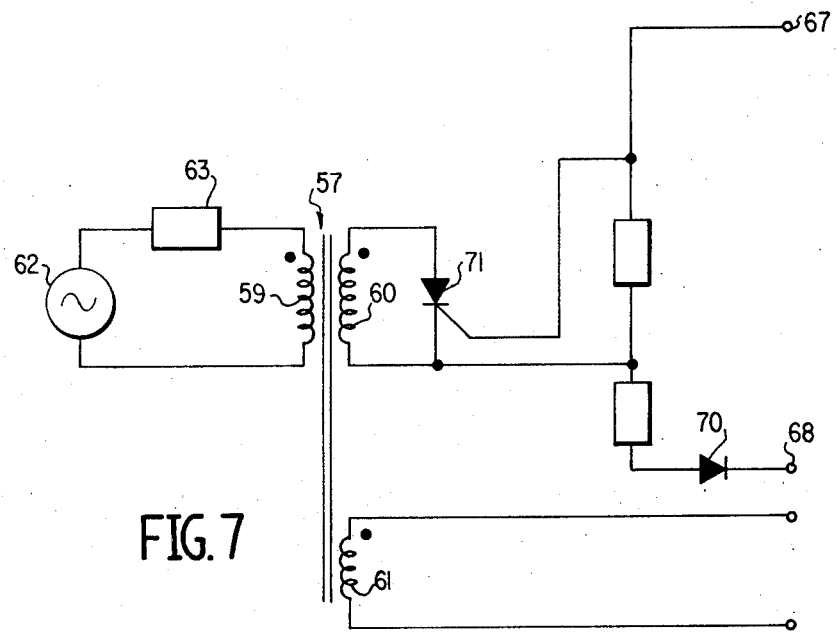

As shown in FIG. 7, the transistor 69 of FIG. 6 can be replaced by a thyristor 71 which serves as a static switch and is connected across the secondary winding 60 of the transformer 57.

From the above, it should now be apparent that in accordance with the present invention, since the position detector thereof is connected directly to the input terminals of the armature winding so as to be energized by the speed electromotive force induced in the armature windings to thereby detect the relative position between the armature windings and the magnetic poles of the reaction rail that any misoperation of the static commutator is effectively eliminated.

Obviously, numerous modifications and variations of the present invention are possible in light of the above teachings. Thus, for example, while in the above discussion the linear electric motor has been described as a drive for a high speed train, it is, however, to be understood that the same can be adapted for driving any other desired rectilinear object. Moreover, with the present invention, it should be apparent that the reaction rail may be mounted on a movable object and can be travelled along the elongated stationary armature. It can also be understood that the thyristors provided in the static commuator may be altered by power transistors or the like. Likewise, the thyristor bridges 15 and 25 of FIG. 1 may be altered by a conventional cycloconverter. It is therefore to be understood that within the scope of the appended claims the invention may be practiced otherwise than as specifically described herein.

What is claimed as new and desired to be secured by Letters Patent of the United States is:

1. A linear electric motor comprising:
   an elongated reaction rail having north and south poles alternately disposed therealong;
   an elongated armature having polyphase windings and being magnetically coupled with said reaction rail, said armature being combined with the reaction rail so as to allow rectilinear movement therebetween;
   a static commutator connected to said armature windings of said armature and for applying excitation current selectively and periodically to the respective phase windings of the armature; and
   means for electrically detecting the relative position between said armature windings and the magnetic poles of said reaction rail and to generate control signals for said static commutator, said detecting means being connected directly to said armature windings so as to respond to speed electromotive forces induced in the armature windings by a magnetomotive force of said rail; wherein
   said position detecting means includes a plurality of transformers each having a primary, a secondary and a tertiary winding wound on a core, and a high frequency oscillator for applying its output signals to the primary winding of each said transformer.

2. A linear electric motor according to claim 1, wherein:
   said position detecting means includes photoluminescence-diodes connected directly to said armature windings and a photoelectric transducer for generating the control signals for said commutator in accordance with the illumination of light beams emitted from the photoluminescence-diodes.

3. A linear electric motor according to claim 1, further comprising:
   means in said position detecting means for providing a short circuit across said secondary coil only when the polarity of said speed electromotive force induced in said armature winding is of a predetermined polarity, whereby output signals from said tertiary winding are introduced to said static commutator to control the same only when the terminals of the secondary winding are opened.

4. A linear electric motor according to claim 3, wherein:
   said means for providing a short circuit across said secondary coil includes a diode.

5. A linear electic motor according to claim 3, wherein:
   said means for providing a short circuit across said secondary coil includes a transistor.

6. A linear electric motor according to claim 3, wherein:
   said means for providing a short circuit across said secondary coil includes a thyristor.

* * * * *